United States Patent [19]

Broughton et al.

[11] B 3,923,689

[45] Dec. 2, 1975

[54] REMOVAL OF IRON CONTAMINANTS FROM POROUS MATERIALS

[75] Inventors: Clifton William Broughton, Hallsville, Tex.; Joseph Tucker Truemper, Wilmington, Del.

[73] Assignee: ICI United States Inc., Wilmington, Del.

[22] Filed: Nov. 29, 1972

[21] Appl. No.: 310,271

[44] Published under the Trial Voluntary Protest Program on January 28, 1975 as document no. B 310,271.

[52] U.S. Cl. ............... 252/444; 252/413; 252/415; 252/421; 252/455 Z; 252/463; 423/461
[51] Int. Cl.² .......................................... B01J 21/18
[58] Field of Search .......... 252/413, 415, 412, 444; 423/460, 461

[56] References Cited

UNITED STATES PATENTS

| | | | |
|---|---|---|---|
| 2,912,470 | 11/1959 | Kircher et al. | 252/444 |
| 3,018,288 | 1/1962 | Tokime et al. | 252/444 |
| 3,168,485 | 2/1965 | Khobloch et al. | 252/413 |
| 3,312,697 | 4/1967 | Riethmann et al. | 252/445 |
| 3,576,767 | 4/1971 | Summers | 252/444 |

FOREIGN PATENTS OR APPLICATIONS

| | | | |
|---|---|---|---|
| 1,147,925 | 5/1963 | Germany | 252/444 |

*Primary Examiner*—Daniel E. Wyman
*Assistant Examiner*—P. E. Konopka

[57] ABSTRACT

A method is disclosed for removing iron contaminants from porous materials, such as active carbon. The method involves treating the porous material with an acidic solution containing a suitable reducing agent.

7 Claims, No Drawings

REMOVAL OF IRON CONTAMINANTS FROM POROUS MATERIALS

BACKGROUND OF THE INVENTION

1. Field of the Invention

The present invention relates generally to a method of removing iron contaminants from porous materials. More particularly, the present invention involves treating a porous material containing iron contaminants with an acidic solution comprising a reducing agent.

2. Description of the Prior Art

Various solutions, particularly those containing organic chemical compounds, are frequently purified and/or decolorized by contacting the solution with a porous carbonaceous material. As used herein, the term porous material refers to any material which has a sufficient surface area to allow for the absorption of molecular species and includes, for example, carbonaceous materials such as charcoal, active carbon, and bone char, ion-exchange materials, molecular sieves, activated clays, activated silica, and activated alumina.

Various techniques have been employed utilizing one or more of these porous materials to decolorize and/or purify organic chemical compounds. Where the compound to be treated is a liquid, the liquid is contacted with the porous material by mixing the liquid with the porous material at ambient temperature or at elevated temperatures and subsequently removing the porous material from the treated liquid. Alternatively, the liquid compound may be passed through a bed of the porous material. Where the compound to be treated is a solid, it is generally converted to a liquid, such as a melt, or taken up in a solvent or a combination of solvents and the resulting liquid treated with the porous material either by admixing the liquid with said porous material and thereafter recovering the liquid, for example, by filtration, or by percolating the liquid through a bed containing the porous material.

Of the porous materials described above, active carbons are most commonly employed for decolorizing other compounds. These active carbons are prepared by the high-temperature carbonization or activation of various carbonaceous materials including, for example, sawdust, kelp, wood pulp, coal, peat, wood charcoals, nutshells, bones, and fruit pits. To improve the absorptive capacity of the resulting carbons, the materials are impregnated with certain metallic compounds, such as zinc, barium, calcium, potassium, or sodium usually as the chloride, sulfate, phosphate, oxide, or hydroxide. In addition to these metallic compounds, the carbon may also contain certain metallic compounds that were present in the raw material such as zinc, manganese, barium, calcium, magnesium, iron, potassium, sodium, and silica usually as the chloride, sulfate, phosphate, oxide or hydroxide.

Active carbons from which these metals have been removed are generally the most expensive and they are, therefore, used only in relatively few processes. For most applications, the removal of metals from the porous material is not required and the materials are used without regard to the metals content thereof. However, for the purification and decolorization of certain chemical compounds, the presence of metals in the porous material increases the color of the product being purified. Of the above-mentioned metals, it has been found that the increase in color is generally due to the presence of iron in the porous material.

Several methods have previously been suggested for reducing the iron content of porous materials, particularly active carbon. In U.S. Pat. No. 2,912,470, issued to Kircher et al., it is disclosed that iron and iron oxides may be removed from activated carbon by immersing the carbon in a dilute aqueous solution of hydrochloric acid or sulfuric acid and then washing with water to remove the dissolved iron compounds. However, as was pointed out in U.S. Pat. No. 3,168,485 issued to Knobloch et al., it is now well known that the strong mineral acids remove only a very small amount of the iron generally present in activated carbon. The method suggested in the Knobloch et al. patent was to remove the metals by contacting the activated carbon with a solution of a benzene polycarboxylic acid such as phthalic acid or trimellitic acid in a polar solvent.

The present invention provides a convenient and inexpensive method for removing iron from porous materials such as active carbon.

SUMMARY OF THE INVENTION

In accordance with the present invention, iron is removed from a porous material by a method which comprises treating the porous material with an acidic solution comprising a reducing agent.

DESCRIPTION OF THE PREFERRED EMBODIMENTS

As described above, the present invention comprises contacting a porous material with an acidic solution of a suitable reducing agent. Although not wishing to be bound by any particular theory, but to assist those skilled in the art in understanding the present invention, it is believed that the improved results achieved with the process of this invention may be explained as follows. Part of the problem of removing iron from porous materials by an acid treatment is that the soluble iron forms molecular complexes with the acid and these complexes are readsorbed by the material. It is believed that the addition of a reducing agent converts the iron from a ferric (+3) state to a ferrous (+2) state which does not readily form molecular complexes and is, therefore, not as easily readsorbed by the porous material.

The porous materials which are treated in accordance with the present invention are any of those which contain iron impurities and are to be used in a process in which the iron impurities would be objectionable. Representative porous materials which may be employed include those listed above as well as similar materials.

The reducing agents which may be employed in carrying out the present invention include those which do not deleteriously affect the porous material being treated while at the same time are sufficient to reduce the ferric iron present to ferrous iron. Suitable reducing agents which may be employed in carrying out the present invention include, for example, hydrazine, thiosulfates, sulfites, nitrites, and hydroxylamine. Of these, it is especially preferred to employ hydrazine as the reducing agent since it decomposes during the course of the reaction to form water and nitrogen, neither of which are undesirable in the final product, and also because any excess hydrazine may easily be removed by washing with water. The amount of reducing agent employed has not been found to be narrowly critical to the removal of iron in accordance with the process of the present invention. Generally, the amount of reducing agent employed will depend upon the amount of iron present in the porous material and the percentage of that iron which must be removed for the porous material to be useful in its intended application. For most applications, an amount of reducing agent equal to about 10 times the stoichiometric amount required to reduce the iron present has been found to be sufficient. In the case of hydrazine, 1/4 mole of hydrazine will reduce one mole of soluble iron and, therefore, the preferred amount of hydrazine is equal to about 10/4 moles of hydrazine per mole of iron present in the porous material.

According to the process of the present invention, the porous material is contacted with an acidic solution comprising the reducing agent. It is preferred to employ an acidic solution having a pH of from about 1 to about 2.5. Especially preferred results have been achieved when the pH is about 2.0. The treatment of the present invention may be carried out at any temperature. However, it is preferred to treat the porous material at an elevated temperature generally in the range of from about 60° C. to about 80° C.

Various methods may be employed for treating the porous material with the acidic solution containing the reducing agent. In one method, the porous material is slurried in water and an acidic solution containing the reducing agent is added. Alternatively, the porous material may be added to an acidic solution containing the reducing agent or the acidic solution containing the reducing agent may be passed through a bed of the porous material.

After the porous material has been treated with the acidic solution of the reducing agent as described above, the solution is removed by any suitable method, such as filtration, and the porous material is washed with water and dried.

It has been found that improved results are achieved with the process of the present invention if the porous material is digested with acid prior to its treatment with an acidic solution of a reducing agent as described above. This pretreatment may be carried out by any of the methods which are now well known to those skilled in the art of acid digestion of porous materials. The amount of acid employed in this digestion step can be varied depending upon the amount of acid soluble material to be removed. As illustrative of this digestion step, a batch system may be employed in which the porous material, either in the powdered or granular form, is fed either as a water slurry or dry into a tank wherein it is treated with acid until the desired pH is reached. As above, this pH will also generally be in the range of from about 1 to about 2.5. During the digestion treatment, the temperature may be maintained at any desired level within the range of from ambient temperature to about the boiling point. However, since the removal of iron from the porous material is accelerated with increasing temperature, it is especially preferred to employ an increased temperature. For activated carbon, it is preferred to carry out the digestion step at a temperature of about 70° C. and for a time of about 30 minutes. Following the digestion step, the solid porous material is allowed to settle and the supernatent liquor removed from the tank by pumping or decantation. It has also been found to be desirable to wash the porous material following the digestion step and prior to the treatment with an acidic solution containing a reducing agent. This water washing step may be carried out either at room temperature or at an elevated temperature and may be repeated several times. After washing, the porous material is treated with an aqueous solution comprising a reducing agent, as described above.

The present process may also be employed as part of a continuous operation in which the porous material to be treated is passed downward through a vertical column wherein it is treated with the acidic solution containing the reducing agent and washed prior to removal from the column. As described above, prior to treatment with the acidic solution containing a reducing agent, the porous material may be treated with an acidic solution as it passes down the column.

In order to describe the present invention so that is may be more clearly understood, the following example is set forth. This example is set forth primarily for the purpose of illustration and any enumeration of detail contained therein should not be interpreted as a limitation on the concept of the present invention.

EXAMPLE I

A sample of 80.1 grams of a dry, granular, active carbon of 12 × 40 mesh and 11.03% ash and containing 2,929 ppm. iron as $Fe_2O_3$ and 1,081 ppm. acid extractable iron was slurried in 1,073 ml. of a 2.466 N solution of hydrochloric acid containing 0.065% by weight hydrazine hydrochloride. The resulting slurry, which had a pH of 1.1, was digested at 74° C. for 50 minutes.

After the digestion was completed, the carbon was filtered off and washed ten times with 50 cc. of distilled water which had been heated to 70° C. The carbon was allowed to suck dry on a Buchner funnel between each of these washes.

The dry weight of the recovered carbon was equal to 78.26 grams or a 97.7% yield. This product contained 1,238 ppm. iron as $Fe_2O_3$ and 103 ppm. acid extractable iron. By comparison, a sample of active carbon treated in an identical manner with 1,070 cc. of a 2.782 N solution of hydrochloric acid, but without any reducing agent, contained 1,597 ppm. iron as $Fe_2O_3$ and 290 ppm. acid extractable iron. A third sample of active carbon, after treatment with 1,007 cc. of a 20.7% by weight solution of hydrochloric acid, contained 1,973 ppm. iron as $Fe_2O_3$ and 832 ppm. acid extractable iron.

What is claimed is:

1. In a method for removing iron from a porous carbonaceous material wherein the porous carbonaceous material is treated with an acidic solution, the improvement comprising including in said solution a reducing agent selected from the group consisting of hydrazine, thiosulfates, sulfites, nitrites, and hydroxyl amine, provided that the amounts of acid and reducing agent in said solution are sufficient to solubilize the iron.

2. A method, as claimed in claim 1, wherein the porous material is active carbon.

3. A method, as claimed in claim 1, wherein the reducing agent is hydrazine.

4. A method, as claimed in claim 1, wherein the acidic solution has a pH in the range of from about 1 to about 2.5.

5. A method, as claimed in claim 4, wherein the acidic solution has a pH of about 2.

6. A method, as claimed in claim 1, wherein the porous material has previously been treated with an acidic solution.

7. A method, as claimed in claim 1, wherein the acidic solution is heated to a temperature of from about 60° C. to about 80° C.

* * * * *